United States Patent
Johnson et al.

(10) Patent No.: US 12,405,975 B2
(45) Date of Patent: Sep. 2, 2025

(54) METHOD AND SYSTEM FOR CONSTRAINT BASED HYPERPARAMETER TUNING

(71) Applicant: Oracle International Corporation, Redwood Shores, CA (US)

(72) Inventors: Mark Edward Johnson, Castle Cove (AU); Thanh Long Duong, Seabrook (AU); Vishal Vishnoi, Redwood City, CA (US); Balakota Srinivas Vinnakota, Sunnyvale, CA (US); Tuyen Quang Pham, Springvale (AU); Cong Duy Vu Hoang, Wantima South (AU)

(73) Assignee: Oracle International Corporation, Redwood Shores, CA (US)

( * ) Notice: Subject to any disclaimer, the term of this patent is extended or adjusted under 35 U.S.C. 154(b) by 1047 days.

(21) Appl. No.: 17/216,496

(22) Filed: Mar. 29, 2021

(65) Prior Publication Data

US 2021/0304003 A1    Sep. 30, 2021

Related U.S. Application Data

(60) Provisional application No. 63/119,577, filed on Nov. 30, 2020, provisional application No. 63/002,159, filed on Mar. 30, 2020.

(51) Int. Cl.
  *G06N 20/00*    (2019.01)
  *G06F 16/3329*    (2025.01)
  (Continued)

(52) U.S. Cl.
  CPC ........ *G06F 16/3329* (2019.01); *G06F 18/211* (2023.01); *G06F 18/217* (2023.01);
  (Continued)

(58) Field of Classification Search
  None
  See application file for complete search history.

(56) References Cited

U.S. PATENT DOCUMENTS 10,379,995 B1 *  8/2019  Walters ................ G06V 10/993
10,572,823 B1 *  2/2020  Feinman ................ G06F 21/56
(Continued)

FOREIGN PATENT DOCUMENTS

EP            3620996         3/2020
JP         2016042322 A       3/2016
(Continued)

OTHER PUBLICATIONS

EP21721259.6, "Summons to Attend Oral Proceedings", Oct. 23, 2023, 9 pages.
(Continued)

*Primary Examiner* — David R Vincent
(74) *Attorney, Agent, or Firm* — Kilpatrick Townsend & Stockton LLP

(57) ABSTRACT

Techniques are disclosed for tuning hyperparameters of a model. Datasets are obtained for training the model and metrics are selected for evaluating performance of the model. Each metric is assigned a weight specifying an importance to the performance of the model. A function is created that measures performance based on the weighted metrics. Hyperparameters are tuned to optimize the model performance. Tuning the hyperparameters includes: (i) training the model that is configured based on a current values for the hyperparameters; (ii) evaluating a performance of the model using the function; (iii) determining whether the model is optimized for the metrics; (iv) in response to the model not being optimized, searching for a new values for the hyperparameters, reconfiguring the model with the new values, and repeating steps (i)-(iii) using the reconfigured
(Continued)

model; and (v) in response to the model being optimized for the metrics, providing a trained model.

16 Claims, 9 Drawing Sheets

(51) Int. Cl.
  *G06F 18/21* (2023.01)
  *G06F 18/211* (2023.01)
  *G06N 3/08* (2023.01)
  *H04L 51/02* (2022.01)
(52) U.S. Cl.
  CPC .............. *G06N 3/08* (2013.01); *G06N 20/00* (2019.01); *H04L 51/02* (2013.01)

(56) References Cited

U.S. PATENT DOCUMENTS

| | | | |
|---|---|---|---|
| 10,860,629 | B1 | 12/2020 | Gangadharaiah et al. |
| 2014/0344193 | A1 | 11/2014 | Bilenko et al. |
| 2015/0206065 | A1 | 7/2015 | Abu-Mostafa et al. |
| 2016/0132787 | A1 | 5/2016 | Drevo et al. |
| 2017/0337478 | A1 | 11/2017 | Sarikaya et al. |
| 2018/0336493 | A1 | 11/2018 | Hayes et al. |
| 2019/0019108 | A1 | 1/2019 | Eads |
| 2019/0042887 | A1 | 2/2019 | Nguyen et al. |
| 2019/0156249 | A1 | 5/2019 | Nakata |
| 2019/0236487 | A1 | 8/2019 | Huang et al. |
| 2020/0065705 | A1 | 2/2020 | Cheng et al. |
| 2020/0302225 | A1 | 9/2020 | Dutta et al. |
| 2020/0372307 | A1* | 11/2020 | Arun .................. G06F 18/2178 |
| 2020/0389438 | A1 | 12/2020 | Chakraborty |
| 2021/0295191 | A1 | 9/2021 | Bui et al. |
| 2021/0304056 | A1* | 9/2021 | Qi .......................... G06N 20/20 |
| 2022/0414341 | A1 | 12/2022 | Zotto et al. |

FOREIGN PATENT DOCUMENTS

| | | | |
|---|---|---|---|
| JP | 2017500637 | A | 1/2017 |
| JP | 2019096285 | A | 6/2019 |

OTHER PUBLICATIONS

EP21721669.6 , "Office Action", Oct. 20, 2023, 9 pages.
PCT/US2021/024950 , "International Preliminary Report on Patentability", Oct. 13, 2022, 9 pages.
PCT/US2021/024953 , "International Preliminary Report on Patentability", Oct. 13, 2022, 9 pages.
International Application No. PCT/US2021/024950, International Search Report and Written Opinion mailed on Jun. 18, 2021, 13 pages.
International Application No. PCT/US2021/024953, International Search Report and Written Opinion mailed on Jun. 22, 2021, 13 pages.
Japanese Application No. JP2022-559647, Office Action, Mailed Jan. 21, 2025, 8 pages with English translation.
Okura et al., "Automatic Classification Of Distant Galaxy Lyman-alpha Emitter Observation Data Using Subaru Telescope Hyper Suprime-cam Using Convolutional Neural Network", 11th Forum on Data Engineering and Information Management (17th Annual Conference of Database Society of Japan), Mar. 6, 2019, 9 pages with partial translation. Partial translation.
U.S. Appl. No. 17/216,498, Non-Final Office Action mailed on Jul. 25, 2024, 44 pages.
Tamaazousti et al., Learning More Universal Representations for Transfer-learning, Available Online at: https://arxiv.org/pdf/1712.09708, Sep. 3, 2018, 15 pages.
Zhang et al., DeepRec: a Deep Neural Network Approach to Recommendation With Item Embedding and Weighted Loss Function, Information Sciences, vol. 470, Jan. 2019, pp. 121-140.
"Kentaro the Optimization Technology of the Hyper-parameter in Others and Support Vector Revolution", Japan, Institute of Electronics, Information and Communication Engineers, vol. 102, No. 508, Jan. 16, 2003, pp. 7-12.
Japanese Application No. JP2022-559629, Office Action, Mailed On Feb. 4, 2025, 6 pages with English translation.
U.S. Appl. No. 17/216,498, Final Office Action, Mailed On May 14, 2025, 34 pages.
Andonie , "Hyperparameter Optimization in Learning Systems", Journal of Membrane Computing, vol. 1, Oct. 16, 2019, pp. 279-291.
Indian Application No. IN202247049903, "First Examination Report", mailed Jun. 3, 2025, 6 pages.
Indian Application No. IN202247050693, "First Examination Report", mailed Jun. 3, 2025, 7 pages.

* cited by examiner

METHOD AND SYSTEM FOR CONSTRAINT BASED HYPERPARAMETER TUNING

CROSS-REFERENCES TO RELATED APPLICATIONS

This application is a non-provisional of and claims the benefit of the filing date of the following provisional applications: (1) U.S. Provisional Application No. 63/002,159, filed on Mar. 30, 2020, and (2) U.S. Provisional Application No. 63/119,577, filed on Nov. 30, 2020. The above-referenced provisional applications are incorporated herein by reference in their entirety for all purposes.

FIELD OF THE INVENTION

The present disclosure relates generally to chatbot systems, and more particularly, to techniques of tuning hyperparameters of a machine-learning model used in chatbot systems.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Typically, individual bots employ a model that is trained as a classifier and predicts or infers a class or category for an input, from a set of classes or categories. While creating a machine-learning model, one has to determine parameters of the model that define an architecture of the model. Such parameters are referred to as hyperparameters of the model. The process of determining an ideal configuration of the hyperparameters i.e., values to be assigned to each hyperparameter of the model is referred to as hyperparameter tuning.

Standard hyperparameter tuning algorithms perform the tuning operation of hyperparameters with a single goal (e.g., model accuracy) under consideration. In order to achieve this goal, the hyperparameter tuning algorithm searches for the best hyperparameter configuration that optimizes the single goal. As such, the model is tailored towards optimizing the single goal. For different goals, different models have to be trained, each of which is tailored to optimize a corresponding goal.

Embodiments described herein address these and other problems, individually and collectively.

SUMMARY

Techniques are provided (e.g., a method, a system, non-transitory computer-readable medium storing code or instructions executable by one or more processors) for tuning hyperparameters of a machine-learning model used in chatbot systems. Various embodiments are described herein, including methods, systems, non-transitory computer-readable storage media storing programs, code, or instructions executable by one or more processors, and the like.

By one aspect of the present disclosure, there is provided a method for tuning a set of hyperparameters of a machine-learning model used in a chatbot system. The method obtains one or more datasets for training a machine-learning model and selects a plurality of metrics (or goals) for evaluating performance of the machine-learning model on the one or more datasets. A first weight is assigned to each metric of the plurality of metrics. The first weight specifies an importance of each metric to the performance of the machine-learning model. A cost or loss function is created that measures the performance of the machine-learning model based on the plurality of metrics and the first weights assigned to each of the plurality of metrics. A set of hyperparameters associated with the machine-learning model are tuned in order to optimize the machine-learning model for the plurality of metrics. The process of tuning the set of hyperparameters includes: (i) training, on one or more datasets, the machine-learning model that is configured based on a current set of values for the set of hyperparameters; (ii) evaluating a performance of the machine-learning model on the one or more datasets using the cost or loss function; (iii) determining whether the machine-learning model is optimized for the plurality of metrics based on the evaluating; (iv) in response to the machine-learning model not being optimized for the plurality of metrics, the tuning process searches for a new set of values for the set of hyperparameters, reconfigures the machine-learning model with the new set of values, and repeats steps (i)-(iii) using the reconfigured machine-learning model; and (v) in response to the machine-learning model being optimized for the plurality of metrics, the machine-learning model is provided as a trained machine-learning model.

By one aspect of the present disclosure, there is provided a system comprising one or more data processors and a non-transitory computer readable storage medium containing instructions. The instructions when executed cause the one or more data processors to perform part or all of the one or more methods described herein.

By another aspect of the present disclosure, there is provided a computer-program product tangibly embodied in a non-transitory machine-readable storage medium, which includes instructions configured to cause one or more data processors to perform all or part of the one or more methods described herein.

The foregoing, together with other features and embodiments will become more apparent upon referring to the following specification, claims, and accompanying drawings.

DETAILED DESCRIPTION

Figure 1:
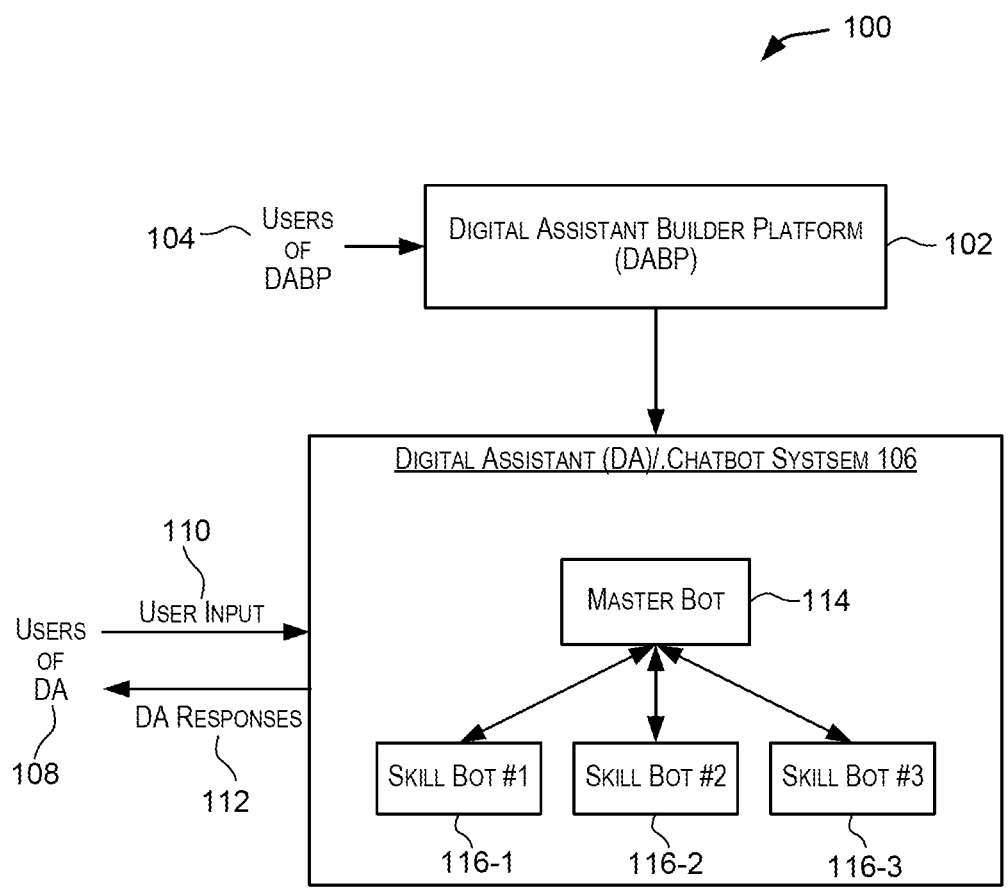
FIG. 1 is a simplified block diagram of a distributed environment incorporating an exemplary embodiment.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

A digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow the chatbot to understand what the user wants the chatbot to do. Intents are comprised of permutations of typical user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing, but are expressed differently. Collectively, the intents, and the utterances that belong to them, make up a training corpus for the chatbot. By training a machine-learning model with the corpus, a customer may essentially turn that machine-learning model (referred to hereafter simply as a "model") into a reference tool for resolving end user input to a single intent. A customer can improve the acuity of the chatbot's cognition through rounds of intent testing and intent training.

However, building a chatbot that can determine the end users' intents based upon user utterances, is a challenging task in part due to the subtleties and ambiguity of natural languages and the dimension of the input space (e.g., possible user utterances) and the size of the output space (number of intents). As such, the chatbot may need to be designed, trained, monitored, debugged, and retrained in order to improve the performance of the chatbot and user experience with the chatbot. In conventional systems, design and training systems are provided for designing and refining the model architecture and training and retraining models of the digital assistant or chatbot in spoken language understanding (SLU) and natural language processing (NLP).

In some instances, the model is trained as a classifier and configured to, for a given input (e.g., an utterance), predict or infer a class or category for that input from a set of target classes or categories. Such a classifier is typically trained to generate a distribution of probabilities for the set of target classes, with a probability being generated by the classifier for each target class in the set and where the generated probabilities sum up to one (or 100%, if expressed as a percentage). In a classifier such as a neural network, the output layer of the neural network may use a softmax function as its activation function to produce the distribution of probability scores for the set of classes. These probabilities are also referred to as confidence scores. The class with the highest associated confidence score may be output as the answer for the input.

Training of models is performed using training data (sometimes referred to as labeled data), where inputs and labels (ground truths) associated with those inputs are known. For example, the training data may include inputs $x(i)$, and for each input $x(i)$, a target value or right answer (also referred to as the ground truth) $y(i)$ for that input. A pair of $(x(i), y(i))$ is called a training sample, and the training data may comprise many such training samples. For example, the training data used for training a model for a chatbot may include a set of utterances, and for each utterance in the set, a known (ground truth) class for that utterance. The space of all the inputs $x(i)$ in the training data may be denoted by $X$, and the space of all the corresponding targets $y(i)$ may be denoted by $Y$. The goal of training the neural network is to learn a hypothesis function "$h(\ )$" that maps the training input space $X$ to the target value space $Y$, such that $h(x)$ is a good predictor for the corresponding value of y. In some implementations, as part of deriving the hypothesis function, a cost or loss function is defined that measures the difference between the ground truth value for an input and the value predicted for that input by the model. This cost or loss function is minimized as part of the training. Training techniques such as back propagation training techniques used with neural networks may be used that iteratively modify/manipulate the weights associated with inputs to perceptrons in the neural network with the goal to minimize the loss function associated with the output(s) provided by the neural network.

As stated previously, standard hyper-parameter tuning algorithms perform the tuning operation of hyperparameters with a single goal (e.g., model accuracy) under consideration. A drawback of such standard hyperparameter tuning algorithms is that it ignores other important goals (e.g., regression errors) while performing the optimization process. Additionally, the standard hyperparameter tuning mechanisms only consider a single dataset for training/evaluating the machine-learning model. Even though some hyperparameter tuning algorithms consider multiple datasets while evaluating the model, each of the datasets is considered to have a same level of importance in the training of the machine-learning model.

Accordingly, a different approach is needed to address these problems. The present disclosure provides for a hyperparameter tuning system and techniques, which optimize a function while considering multiple metrics at once i.e., performs multi-objective optimization. Each of the metrics is assigned a weight signifying a level of importance of the metric to the performance of the machine-learning model. The hyper-parameter tuning system and technique also provide for tuning of hyperparameters while considering different datasets of varying levels of importance. Specifically, a weight is assigned to each dataset specifies an importance of the dataset in training the machine-learning model. Additionally, the hyper-parameter tuning system and techniques enable one or more constraints to be for the machine-learning model being trained. The training infrastructure (also referred to herein as a hyper-parameter tuning system) employs various automated techniques to automatically identify, set, and tune hyperparameters for training the model, such that the trained model complies with and satisfies the constraints specified for the model. In this manner, the hyperparameter tuning system of the present disclosure provides for a single machine-learning model that works across different datasets and different metrics.

Bot System

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user input 108 may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing. The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above steps is briefly described below.

(1) Configuring settings for a new skill bot—Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
  (a) a context section
  (b) a default transitions section
  (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Constraint and Target Based Hyperparameter Tuning

As stated previously, a chatbot may use one or more machine-learning models for performing various functions. For example, a chatbot may use a machine-learning model that is configured to take utterances as inputs and infer or predict an intent for each utterance. The intent that is inferred by the model for an utterance may then be used by the chatbot to determine how to respond to the utterance. Implementing the machine-learning model (also referred to as a model) in a chatbot, is usually done in two phases: (1) a training phase in which training data is run on one or more algorithms to create a trained model, and (2) an inference phase in which the trained model is used to make predictions based on new data. A training infrastructure is generally provided for implementing the training phase to train the model. The training infrastructure may be provided by a tool or application, or software that is used to perform the training. The training infrastructure is configured to run the training data on one or more algorithms to train or learn the algorithms and create a model. The training infrastructure generally provides hyperparameters that govern this training process. The set of values for these hyperparameters determine the network structure for the algorithms (e.g., a number of input layers, a number of hidden layers, activation functions, etc.) and how the algorithms are trained (e.g., learning rate, number of epochs, etc.).

Figure 2:
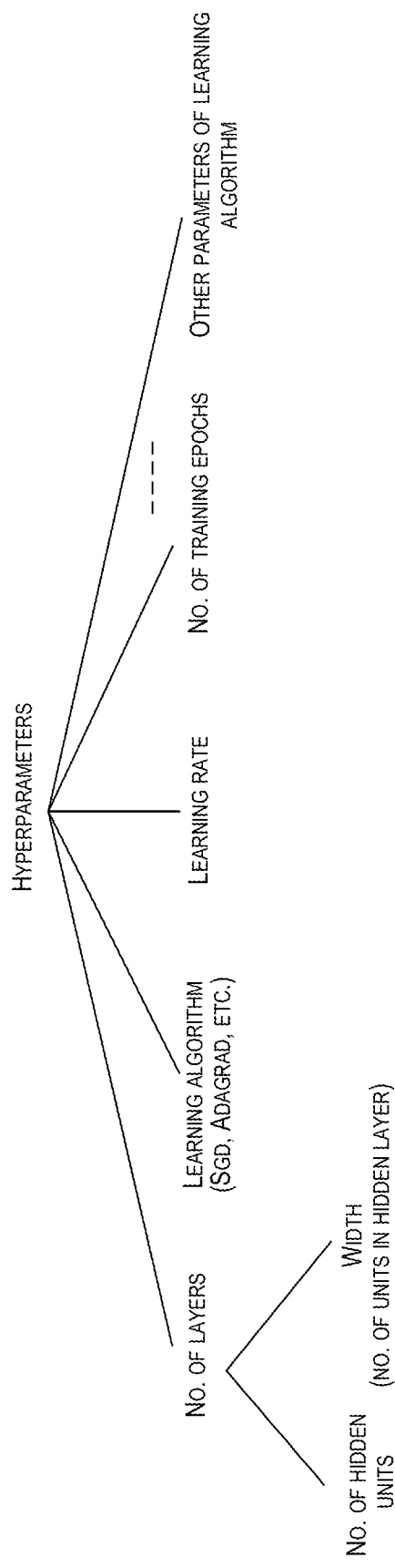
FIG. 2 depicts exemplary types of hyperparameters in accordance with various embodiments.
Figure 3:
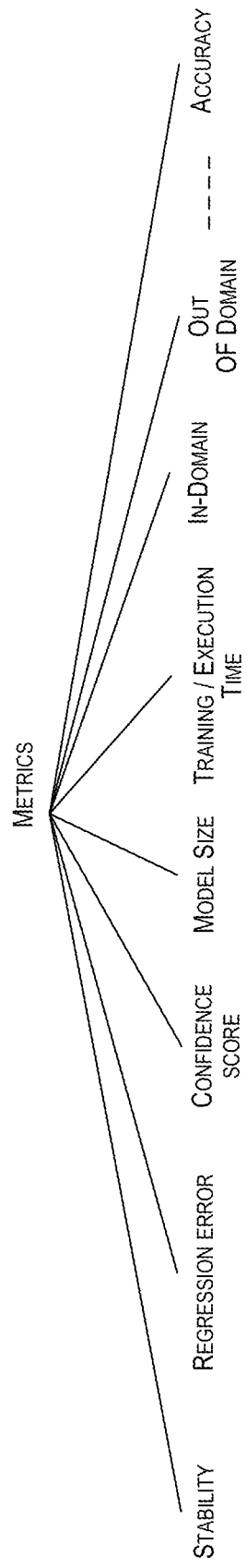
FIG. 3 depicts exemplary types of metrics in accordance with various embodiments.

FIG. 2 depicts exemplary types of hyperparameters in accordance with various embodiments. The hyperparameters may include: a number of layers in the model, a type of learning algorithm used to train the model, a learning rate, a number of training epochs, a number of hidden units in each layer, and a width i.e., a number of units in each hidden layer. Typically, a user who is using the training infrastructure sets the values for the hyperparameters manually. However, this can be a very difficult task requiring very deep knowledge of the training process. As will described next with reference to FIG. 4, there is provided a hyperparameter tuning system in accordance with various embodiments, which is configured to perform, in an automated manner, multi-objective optimization i.e., optimize a function (e.g., a loss function) of multiple metrics. As shown in FIG. 3, the metrics may include a stability metric, a regression error metric, a confidence score metric, a model size metric, a training time or execution time metric, an accuracy metric, or any combination thereof.

The stability metric ensures that the training process is stable i.e., the predictions made by the model do not radically change when minor changes are made to the training data (e.g., when one training example is added or removed). The regression error metric minimizes a number of regressions of the model i.e., regression error corresponds to a model classifying some input incorrectly, but a previous version of the model had correctly classified the input. The confidence score metric ensures that the model predicts certain examples with high confidence (i.e., not only does the model make correct predictions, but it does so with high confidence). The model size metric corresponds to a size of the trained model to be within a user defined threshold e.g., 100 megabytes, whereas the training time metric corresponds to an amount of time utilized in training the model. The accuracy metric ensures that the trained model achieves a certain user defined level of accuracy e.g. 95% accuracy on certain validation datasets. In other words, a specific target accuracy is achieved on specific validation datasets when the machine-learning model is trained on specific training datasets. It is appreciated that the training and validation datasets can be selected to span across a full range of use cases for the chatbot i.e., datasets ranging in size from very small datasets to very large datasets across a range of applications.

The hyperparameter tuning system of the present disclosure is configured to train a machine-learning model with respect to multiple datasets (e.g., training datasets) and evaluate a performance of the machine-learning model with respect to a plurality of metrics. According to some embodiments, each of the datasets used in training the machine-learning model is assigned a weight that indicates an importance of the dataset in training the machine-learning model. In other words, the weight assigned to a dataset corresponds to a level of influence the dataset has on the training of the machine-learning model.

Further, the hyperparameter tuning system is configured to assign a weight to each metric utilized in the multi-objective optimization. Specifically, the weight assigned to a metric indicates an importance of the metric to the performance of the machine-learning model. As will be described in detail below, the assignment of weights to the metrics as well as to the different datasets are performed in accordance with one or more policies governing the hyperparameter tuning system.

Additionally, the hyperparameter tuning system enables one or more constraints to be specified in training the machine-learning model. A constraint may be a requirement imposed upon the machine-learning model i.e., a quality or a characteristic that the user desires to achieve in the trained model. A constraint may be related to the training process itself. The constraints may be specified before commencing the training of the model. Thus, for a given set of constraints, the training infrastructure employs various automated techniques to automatically identify, set the values of, and tune hyperparameter values for training the machine-learning model such that the trained machine-learning model complies with and satisfies the set of constraints.

By some embodiments, the hyperparameter tuning system provisions for validating the machine-learning model on a wide range of validation/test datasets. The hyperparameter tuning system associates specific target values to one or more metrics that are used to evaluate a performance of the machine-learning model. A hyperparameter objective function (e.g., a loss function) is constructed based on the target values for the multiple metrics. Additionally, as will be described in detail below with reference to FIG. 4, the hyperparameter tuning system employs an asymmetric loss mechanism (i.e., not meeting a target is penalized heavily as compared to the case of rewarding for meeting or surpassing the target) to assign weights to the different metrics in validating the machine-learning model.

Figure 4:
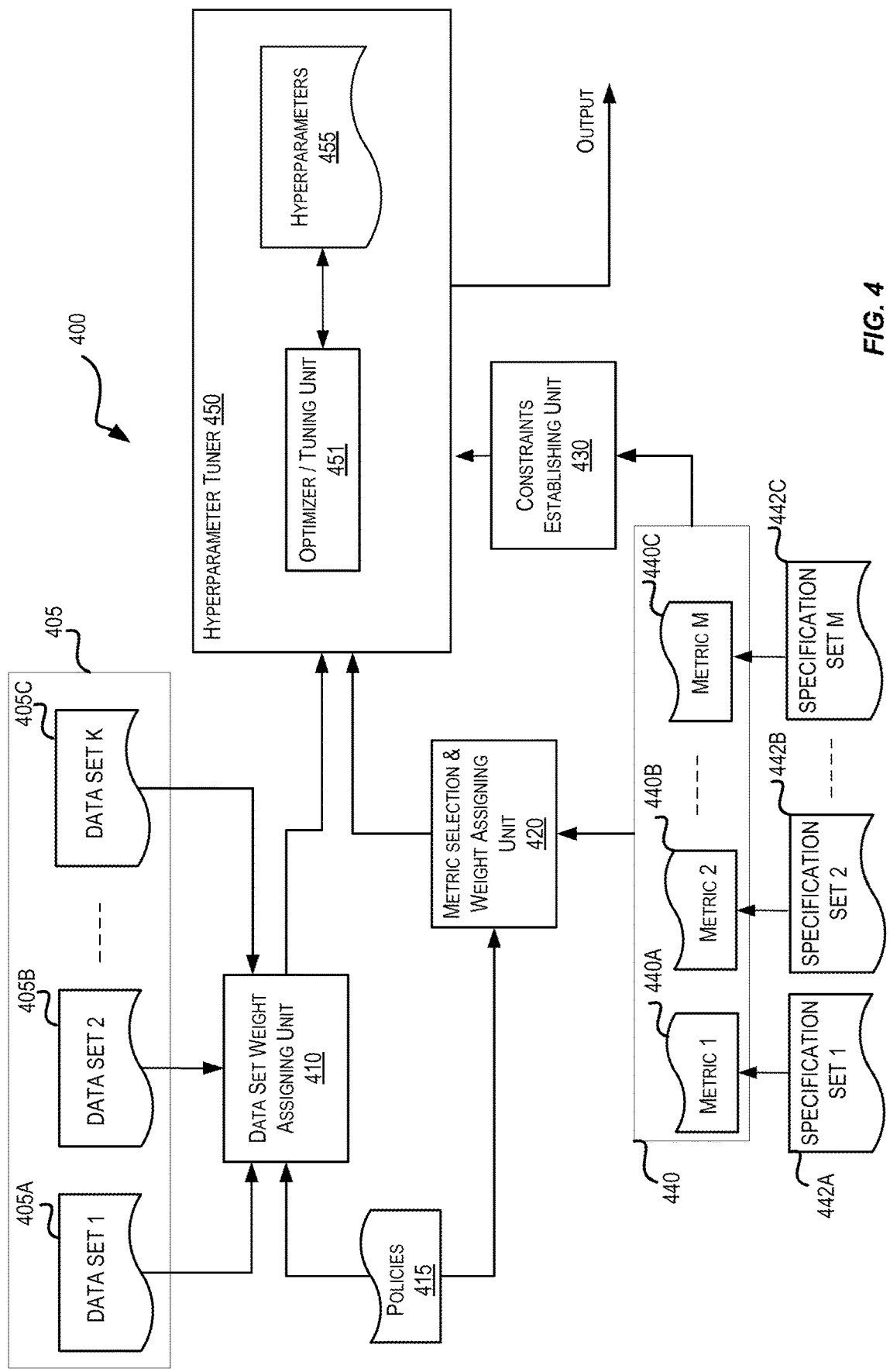
FIG. 4 illustrates a hyperparameter tuning system in accordance with various embodiments.

Turning to FIG. 4, there is depicted a hyperparameter tuning system in accordance with various embodiments. The hyperparameter tuning system 400 includes a data set weight-assigning unit 410, a metric selection and weight-assigning unit 420, a constraint establishing unit 430, and a hyperparameter tuner 450. The hyperparameter tuner 450 includes an optimizer 451 (also referred to herein as a tuning unit), and a set of hyperparameters 455.

The hyperparameter tuning system 400 is configured to train a machine-learning model (e.g., a model associated with a chatbot) with respect to multiple datasets (i.e., training datasets), and evaluate a performance of the machine-learning model based on a plurality of metrics. The dataset weight-assigning unit 410 obtains one or more datasets e.g., dataset 1 405A, dataset 2 405B, and dataset K 405C, and assigns a weight to each dataset in accordance with some policies 415. The weight assigned to a dataset corresponds to an importance of the dataset in training the machine-learning model. Assigning different weights to different datasets provisions for the datasets to have an appropriate influence (i.e., in accordance with their respective weights) on the training of the machine-learning model.

As an example, one policy of the policies 415 may require the machine-learning model to achieve a low regression. As such, the dataset weight-assigning unit 410 assigns a regression dataset (e.g., dataset 1 405A) a higher weight than another type of dataset. As another example, dataset 1 405A may correspond to a dataset obtained from a first client of the hyperparameter tuning system 400, and dataset 2 405B may correspond to a dataset obtained from a second client that is different from the first client. The training data included in dataset 1 and dataset 2 may correspond to different types of user utterances (provided by the respective clients) with respect to a context. Assuming that one of the policies 415 indicates that the first client is more important than the second client (e.g., the first client has a higher service level agreement (SLA) with the hyperparameter tuning system 400), then the dataset corresponding to the first client i.e., dataset 1 405A is assigned a higher weight that dataset 2 405B. Moreover, it is appreciated that a system administrator of the hyperparameter tuning system 400 determines the policies 415 prior to the training of the machine-learning model. The weighted datasets 405 is provided as a first input to the hyperparameter tuner 450.

The metric selection and weight assigning unit 420 selects a plurality of metrics 440 e.g., metric 1 440A, metric 2 440B, and metric M 440C for evaluating the performance of the machine-learning model with respect to the one or more datasets 405. Note that the metrics 440 correspond to metrics such as stability, accuracy, model size, regression error etc., as depicted and described with respect to FIG. 3. In one embodiment, the metric selection and weight-assigning unit 420 selects a plurality of metrics e.g., metric 1 440A, metric 2 440B, etc., from the set of available metrics 440 based on certain criteria. For example, a first client of the hyperparameter tuning system 400 may desire the machine-learning model to emphasize on an accuracy parameter, whereas another client of the hyperparameter tuning system 400 may desire machine-learning model to emphasize on another metric e.g., regression error metric. The requirements of different clients may be stored as one of the policies 415 based on which, the metric selection and weight-assigning unit 420 selects a plurality of metrics for evaluating performance of the machine-learning model.

The metric selection and weight-assigning unit 420 is further configured to assign weights to each of the selected metrics. The weight assigned to a specific metric indicates an importance of the metric to the performance of the machine-learning model. In one embodiment, the metric selection and weight-assigning unit 420 assigns weights to the metrics based on a level of importance of clients of the hyperparameter tuning system 400. For example, if a first client is more important than a second client (i.e., the first client has a higher SLA than the second client), then the metric requested by the first client is assigned a higher weight that the metric requested by the second client. As another example, consider a machine-learning model trained for domain detection. In such a case, there are two metrics: in-domain recall and out-of-domain recall that are used to evaluate a performance of the machine-learning model. In such a domain detecting model, it is often desired that the model performs well i.e., above a certain threshold level with respect to in-domain detections as compared to out-of-domain detections. In this case, the weight-assigning unit 420 assigns a higher weight to the in-domain recall metric as compared to the out-of-domain recall metric. The plurality of weighted metrics are provided as a second input to the hyperparameter tuner 450.

Figure 5:
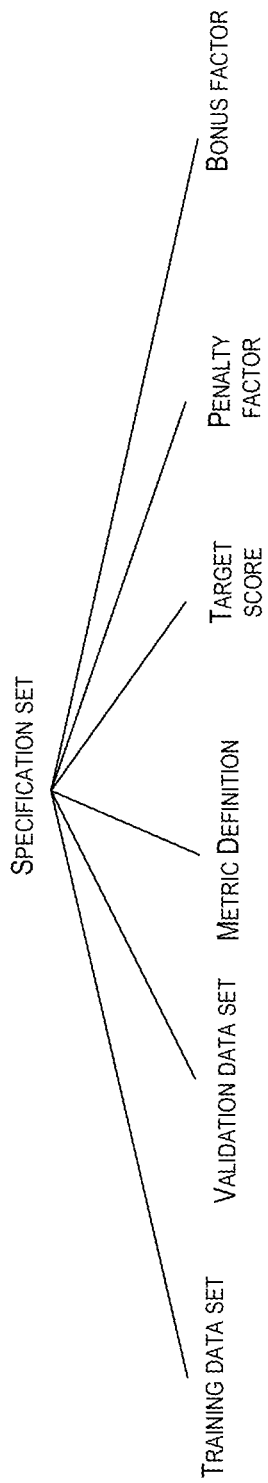
FIG. 5 depicts an exemplary specification set associated with a metric in accordance with various embodiments.

Each of the metrics 440 is associated with a corresponding specification set. The specification set includes a plurality of specification parameters that define or characterize the metric. As shown in FIG. 4, metric 1 440A is associated with specification set 1 442A, metric 2 440B is associated with specification set 2 442B, and metric M 440C is associated with specification set M 442C. It is appreciated that the specification set associated with a particular metric can be configured independently with respect to the specification sets associated with other metrics. Referring to FIG. 5, the specification set of a metric includes: (1) a training dataset, (2) a validation dataset, (3) a metric definition that defines a measure as to how well a model satisfies a target goal on datasets e.g., training and validation datasets, (4) a target score for the metric (i.e., a score for the metric that the model is expected to meet), (5) a penalty factor for the metric, and (6) a bonus factor for the metric.

According to some embodiments, the metrics may be permitted to share training and/or validation data sets. However, the machine-learning model is expected to produce results that are more robust if there is a diversity of training and validation datasets between the different metrics. The specification parameters of each of the specification sets 442A, 442B, and 442C can be set to certain values to achieve desired results. For instance, with regard to the metric of regression error, the corresponding specification set can be configured as follows:

1. The training datasets are modelled based on a certain set of customers e.g., important customers. The validation dataset includes examples that the previous machine-learning model correctly classified, and that are expected to be used widely by customers.
2. The metric definition for regression error is set to be accuracy.
3. The target score is set to 95%, i.e., one expects to achieve at least 95% of the examples that the old version of the machine-learning model correctly labelled to also be correctly labelled in a new version of the machine-learning model.
4. The penalty factor is set to 100, and the bonus factor is set to 1. In doing so, each percentage point below 95% is penalized 100 times more than a percentage point above 95%.

In one embodiment, with regard to the metric of stability, the corresponding specification set can be configured as follows:

1. The training dataset is set to be a small dataset in size, as small data sets are expected to incur higher instability. The validation dataset may be set to be reasonably larger in size than the training data set.
2. The metric definition for stability is set to be a standard deviation in the machine-learning model's accuracy scores on the validation dataset, e.g., when the machine-learning model is trained 10 times.
3. The target score is set to 5%, i.e., it is desired to have a variation in the machine-learning model's accuracy score to be at most 5%.
4. The penalty factor is set to 10, and the bonus factor is set to 1. In doing so, each percentage point not meeting the target score incurs a 10 times greater loss than a percentage point improvement beyond the target score.

In one embodiment, with regard to the metric of confidence score, the corresponding specification set can be configured as follows:

1. The training datasets can range from small to large in size, and vary by domain. The validation dataset may contain in-domain examples that belong to their intent class labels.
2. The metric definition for the confidence score metric is set to be a fraction of sentences for which the model's confidence threshold is greater than 25% (i.e., the prediction is correct, and at least 25% more confident than any other prediction).
3. The target score is set to 85%, i.e., at least 85% of the examples are desired to be confidently labelled.
4. The penalty factor is set to 10, and the bonus factor is set to 1.

It is appreciated that the configurations of the above described specification sets is intended to be illustrative and non-limiting. A system administrator may configure each of the specification sets in any other manner based on different requirements. Further, the utilization of different specification sets in validating the machine-learning model is described below with reference to the hyperparameter tuner 450.

According to some embodiments, the hyperparameter tuning system 400 enables a user (e.g., a system administrator) to specify one or more constraints for the hyperparameter tuning of the machine-learning model. The one or more constraints are specified via the constraint establishing unit 430. The one or more constraints are provided as a third input to the hyperparameter tuner 450. Each constraint is a requirement imposed upon the hyperparameter tuning of the machine-learning model i.e., each constraint is a requirement that is to be satisfied by the trained machine-learning model. Given the one or more constraints, the hyperparameter tuner 450 is configured to identify a set of hyperparameters that influence each constraint, specify values for the identified hyperparameters, and iteratively tune the hyperparameters until the trained machine-learning model satisfies each of the one or more constraints as described below.

In one embodiment, for each of the one or more constraints, the hyperparameter tuner 450 identifies one or more hyperparameters from the set of hyperparameters 455 that affect each constraint. The hyperparameter tuner 450 identifies the one or more hyperparameters that affect a constraint by varying values of the hyperparameters and determining whether the varying of values of the hyperparameters affects a value associated with the constraint. Furthermore, it is appreciated that a first set of hyperparameters that affects a first constraint may be different from a second set of hypermeters that affect a second constraint.

Upon identifying the one or more hyperparameters that affect each constraint, the hyperparameter tuner 450 specifies values for the set of hyperparameters 455 and iteratively tunes the hyperparameters until each of the constraints is satisfied. As an example, consider the set of hyperparameters 455 to include five hyperparameters: H=[h1, h2, h3, h4, h5]. Further, for the sake of illustration, consider that a user specifies two constraints, C1 and C2, where the hyperparameter tuner 450 has identified that hyperparameters h1 and h3 affect constraint C1, and hyperparameters h2, h3, and h5 affect constraint C2.

The optimizer 451 (also referred to herein as a tuning unit) of the hyperparameter tuner 450 specifies values for the set of hyperparameters H i.e., V (H)=[v (h1), v (h2), v (h3), v (h4), V (h5)], referred to herein as a configuration of the hyperparameters. It is noted that the optimizer 451 assigns an initial configuration of the hyperparameters in a random manner. Further, with respect to constraint C1, the optimizer iteratively changes the values of the hyperparameters h1 and/or h3 (while maintaining the values of h2, h4, and h5) until constraint C1 is satisfied. Note that a constraint is satisfied when the values of the hyperparameters affecting the constraint satisfy the requirement imposed by the constraint. With respect to constraint C2, the optimizer 451 iteratively changes/modifies the values of hyperparameters h2, h4, and/h5 (while maintaining the values of h1 and h3) until constraint C2 is satisfied. Note that the optimizer performs the above described iterations while training the machine-learning model with respect to the one or more datasets. Specifically, as described next, the optimizer 451 determines the optimal configuration of the hyperparameters that satisfy each of the constraints while optimizing an objective function (e.g., a cost or loss function) of the machine-learning model for the plurality of metrics. In one embodiment, examples of user specified constraints include constraints such as:—

- an inference latency for a given batch is to be less than a particular threshold e.g., latency is to be less than 50 milliseconds for a batch size of one.
- a maximum size of the trained model is required to be below some specified threshold (e.g., 10 MB).
- a training time of the model is to be less than some user-specific time threshold e.g., training time is to be less than or equal to five minutes.

Further, in some embodiments, the multiple constraints specified by the user are prioritized. For example, each constraint is assigned a level of importance reflecting the fulfillment of that constraint. In some embodiments, constraints may be specified such that the trained machine-learning model must necessarily fulfill some constraints, whereas fulfillment of other constraints is desired but optional.

The optimizer 451 of the hyperparameter tuner 450 constructs/formulates an objective function to be optimized. The objective function is a loss function or a cost function that serves as a performance indicator of training/validating the machine-learning model with the one or more training/validation datasets. In one embodiment, the objective function's arguments are the set of hyperparameters associated with the machine-learning model, which are optimized by the optimizer 451. A value of the objective function is a weighted combination of a difference between each metric's actual value and the target value configured for each metric. The weight of each metric in the weighted combination depends on whether the metric exceeds or fails to exceed the target value. Specifically, an asymmetric loss technique is utilized in which higher weights associated with failing to achieve the target value (than exceeding the target value) are assigned to the metrics.

For instance, according to one embodiment, the objective function can be formulated as follows: if v is a vector of hyperparameter values, $m_i(v)$ is denoted as the value of the $i^{th}$ metric on v, $t_i$ is denoted as the target value for the $i^{th}$ metric, and $p_i$ and $b_i$ are denoted as the penalty and bonus factors for the $i^{th}$ metric, respectively, then an objective function or a loss function (L (v)) can be formulated as:

$$L(v)=\Sigma_i p_i \max(t_i-m_i(v),0)-b_i \max(m_i(v)-t_i,0)$$

The optimizer 451 tunes the set of hyperparameters 455 associated with the machine-learning model in order to optimize the objective function (e.g., obtain a minimum value for the loss function) over the plurality of metrics. The optimizer may utilize one of grid-based method, a gradient search method, and Bayesian method to tune the set of hyperparameters. Details regarding the tuning of the hyperparameters is described next with reference to FIG. 5 and FIG. 6. In this manner, the hyperparameter tuner 450 trains/validates the machine-learning model by tuning the set of hyperparameters to achieve an optimal performance with respect to the different weighted metrics while ensuring that each of the one or more constraints is satisfied. In other words, the hyperparameter tuning system 400 performs optimization of multiple weighted metrics by training the machine-learning model on different weighted datasets while supporting one or more user-specified constraints. Upon optimizing the machine-learning model for the plurality of metrics, the hyperparameter tuning system 400 outputs the trained/validated ML model along with configuration of the hyperparameters that optimize the objective function as well as satisfy the one or more constraints. In the above described embodiments, the optimizer 451 constructs and optimizes the objective function. It is noted that the configuration of the hyperparameter tuner 450 as described above is not intended to limit the scope of the present disclosure. For instance, the hyperparameter tuner 450 may include an objective function formulating unit (not shown) that formulates the objective function, which is optimized by the optimizer 451.

Figure 6:
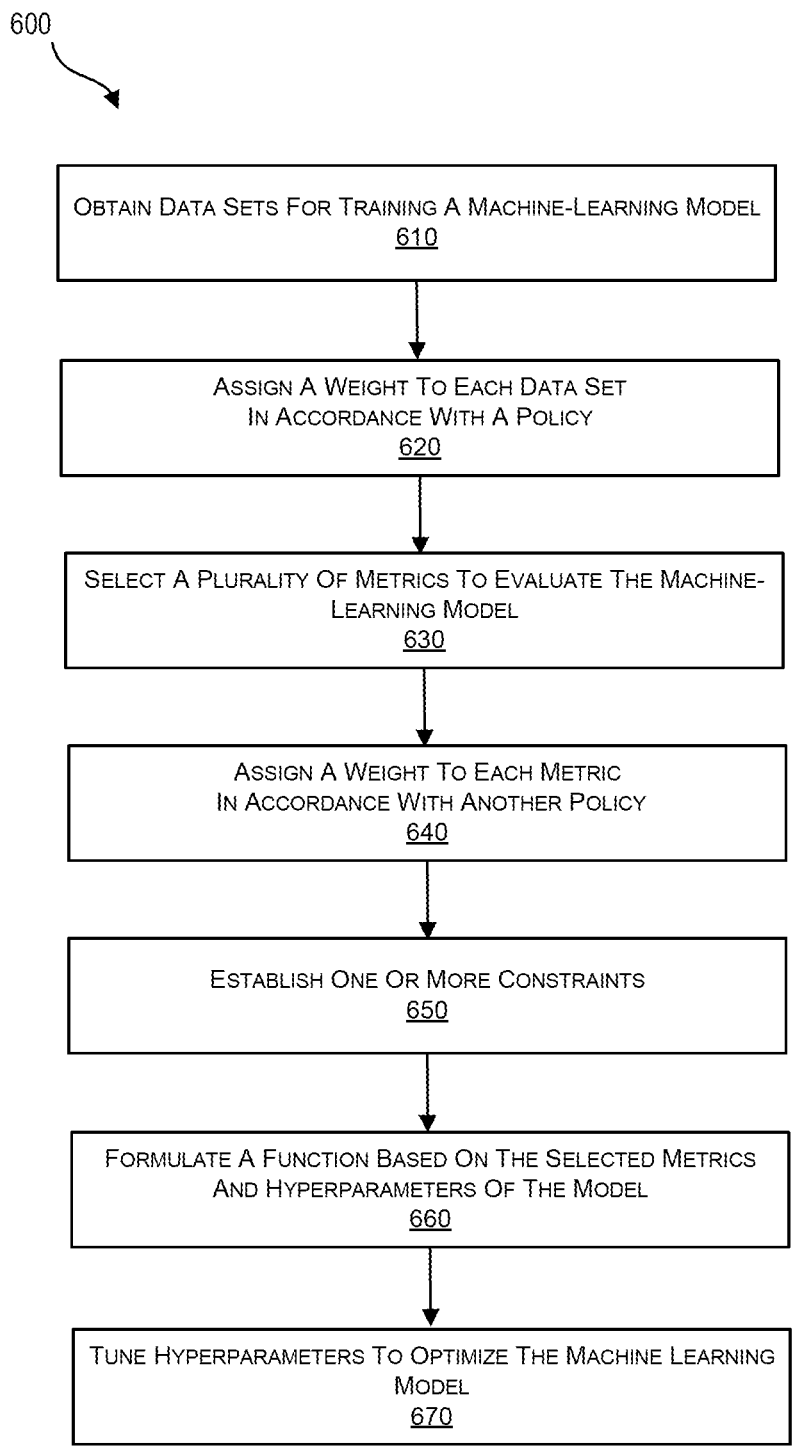
FIG. 6 depicts a flowchart illustrating a training process performed by the hyperparameter tuning system in accordance with various embodiments.

FIG. 6 depicts a simplified flowchart 600 depicting a training process performed by the hyperparameter tuning system according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel.

In step 610, datasets for training a machine-learning model are obtained. In step 620, the hyperparameter tuning system assigns a weight to each of the obtained datasets in accordance with a policy. It is noted that assigning different weights to different datasets allows for the datasets to have an appropriate influence (i.e., in accordance with their respective weights) on the training of the machine-learning model.

In step 630, a plurality of metrics are selected for evaluating performance of the machine-learning model on the obtained datasets. For example, one or more metrics as depicted in FIG. 3 are selected by a user (e.g., system administrator) for evaluating the performance of the machine-learning model. For each selected metric, a weight is assigned in accordance with another policy to the metric in order to indicate an importance of the metric to the performance of the machine-learning model (step 640). In step 650, the user establishes one or more constraints. Each constraint is a quality or characteristic that the user desires to achieve in the trained machine-learning model. In other words, each constraint is a requirement imposed upon the machine-learning model.

At step 660, the process formulates/constructs a function (i.e., an objective function) based on the input weighted metrics and the set of hyperparameters 455. In one embodiment, the objective function is a loss function or a cost function that serves as a performance indicator of training the machine-learning model with the one or more datasets.

At step 670, the process iteratively tunes the set of hyperparameters associated with the machine-learning model in order to optimize (e.g., obtain an optimal value of the objective function) the machine-learning model for the plurality of metrics. For instance, in training the machine-learning model on the weighted datasets, one or more hyperparameters that affect the one or more constraints and/or the function are identified by varying values of the hyperparameters and determining, whether varying the values of the hyperparameters affects a value associated with the constraint and/or the function.

In one embodiment, in the process of tuning the hyperparameters, the process evaluates for a current configuration of the hyperparameters (i.e., values of the hyperparameters), a value of the function and determines whether the current configuration satisfies each of the one or more constraints. If at least one of the constraints is violated and/or the value of the function is not optimal, the tuning process modifies values of one or more hyperparameters to obtain a new configuration of the hyperparameters and continues training the machine-learning model based on the new configuration. Note that the determination of whether the current configuration violates a particular constraint is performed by determining whether the values of one or more hyperparameters affecting the constraint satisfy a requirement imposed by the constraint. Further, a determination of whether the value of the function (indicating performance of the machine-learning model with respect to the current configuration) is optimal is made by comparing the value of the function with a new value of the function that is obtained via a different configuration of the hyperparameters.

In this manner, the tuning process iterates through the space of hyperparameter values until a configuration that results in the optimal value of the function (and which does not violate any constraints) is achieved. Moreover, it is appreciated that the process of tuning hyperparameters can commence with an initial configuration of the hyperparameters that is assigned in a random manner. Furthermore, the tuning process can implement one of a random search method, a Bayesian search method, a branch and bound method, a grid search method, genetic algorithms, etc., in searching the space of hyperparameter values to obtain a new hyperparameter configuration. Upon the machine-learning model being optimized, the machine-learning model (along with the values of the hyperparameters that achieve the optimized machine-learning model) is output as a trained machine-learning model to a user.

Figure 7:
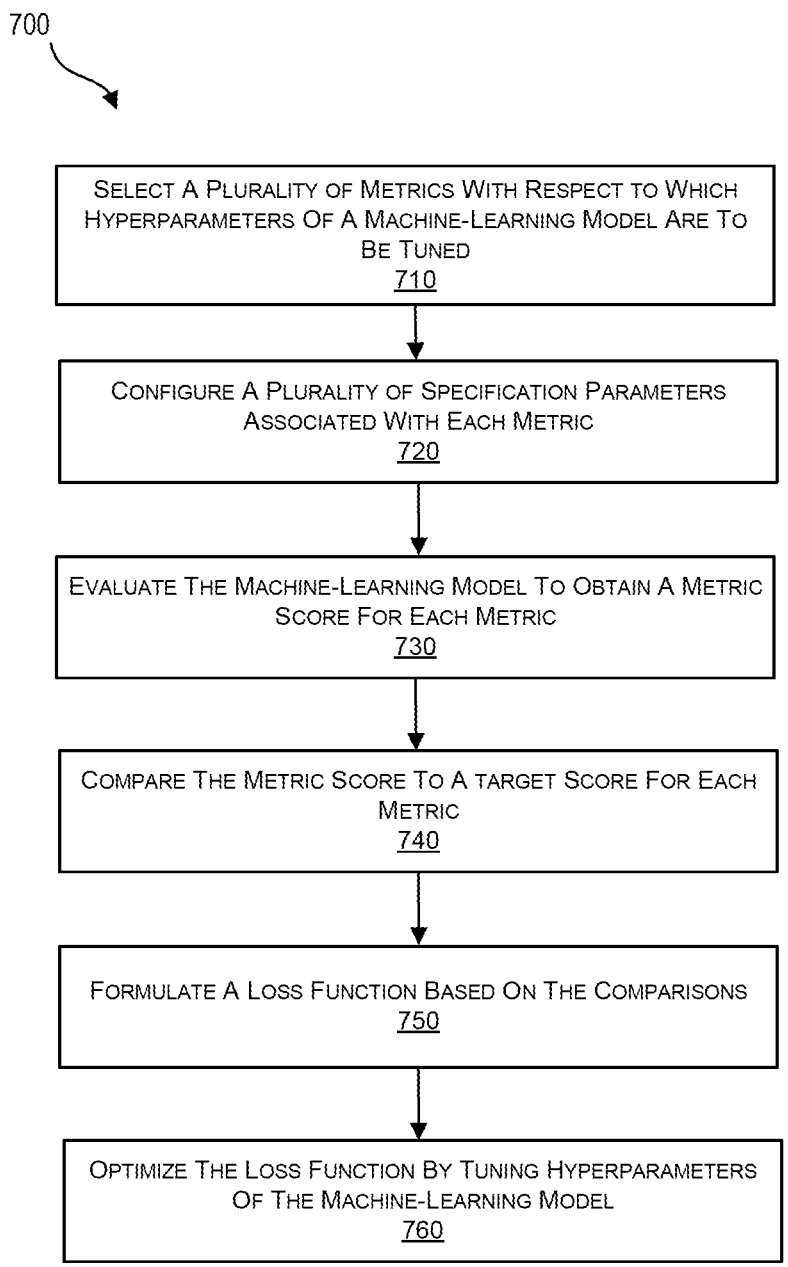
FIG. 7 depicts a flowchart illustrating a validation process performed by the hyperparameter tuning system in accordance with various embodiments

FIG. 7 depicts a simplified flowchart 700 depicting a validation process performed by the hyperparameter tuning system according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel.

In step 710, a plurality of metrics are selected for evaluating a performance of the machine-learning model, and with respect to which hyperparameters of the machine-learning model are to be tuned. At step 720, a specification set associated with each selected metric is configured in accordance with a criterion. Specifically, values are assigned to the specification parameters included in the specification set based on the criterion. For example, if it is desired to reduce regression errors, then the specification set associated with the regression error metric is configured as follows: a low value is set for the target score, and a high value is set for the penalty factor corresponding to the regression error metric. As an example, the target score may be set to 90% i.e., it is expected that at least 90% of the training examples that were correctly labelled previously are also labeled correctly by a current version of the machine-learning model. Further, setting a high penalty factor e.g., a penalty factor of 100, implies that each percentage point (i.e., performance of the machine-learning model) below 90% is penalized 100 times more than a percentage point above 90%. In configuring the specification set of the regression error metric in this manner, the regression errors dominate the objective function (i.e., loss function) and the hyperparameter tuner of FIG. 4 performs the tuning of hyperparameters that minimize regression errors.

In step 730, a metric score is computed for each metric. Specifically, the selected metrics are evaluated on validation datasets, which produces a metric score for each metric. The metric score computed for each metric is compared to a corresponding target score for the metric in step 740. In one embodiment, a difference between the metric score and the target score of the metric is computed. If the metric score is higher than the target score, then the difference is multiplied by a bonus factor associated with the metric. However, if the metric score is lower than the target score, then the difference is multiplied by the penalty factor. In step 750, an objective function e.g., a loss function is formulated based on the processing performed in step 740. Specifically, the loss function is determined to be a sum of the differences (between the metric score and target score), multiplied by either the corresponding bonus factor or penalty factor. Thereafter, the process moves to step 760 to optimize the formulated objective function.

In step 760, the hyperparameter tuner iteratively tunes the hyperparameters associated with the machine-learning model in order to optimize the weighted loss function (e.g., obtain a minimum value of the loss function) formulated in step 750. In one embodiment, in tuning the hyperparameters, the hyperparameter tuner evaluates for a current configuration (i.e., values of the hyperparameters) a value of the loss function. The hyperparameter tuner further determines whether the value of the loss function is optimal by comparing the value of the loss function with a new value of the loss function that is obtained via a different configuration of the hyperparameters.

In this manner, the tuning process iterates through the space of hyperparameter values until a configuration that results in the optimal value of the loss function is achieved. The process of tuning hyperparameters can commence with an initial configuration of the hyperparameters that is assigned in a random manner. Furthermore, the tuning process can implement a search algorithm to explore the hyperparameter space in order to obtain a new hyperparameter configuration. The hyperparameter tuner can utilize one of a random search method, a Bayesian search method, a branch and bound method etc., in searching the hyperparameter space. Upon the loss function being optimized (i.e., the minimum value of the loss function being achieved), the hyperparameter tuner provides as an output, the validated machine-learning model along with the values of the hyperparameters that achieve the optimized loss function to a user.

Illustrative Systems

Figure 8:
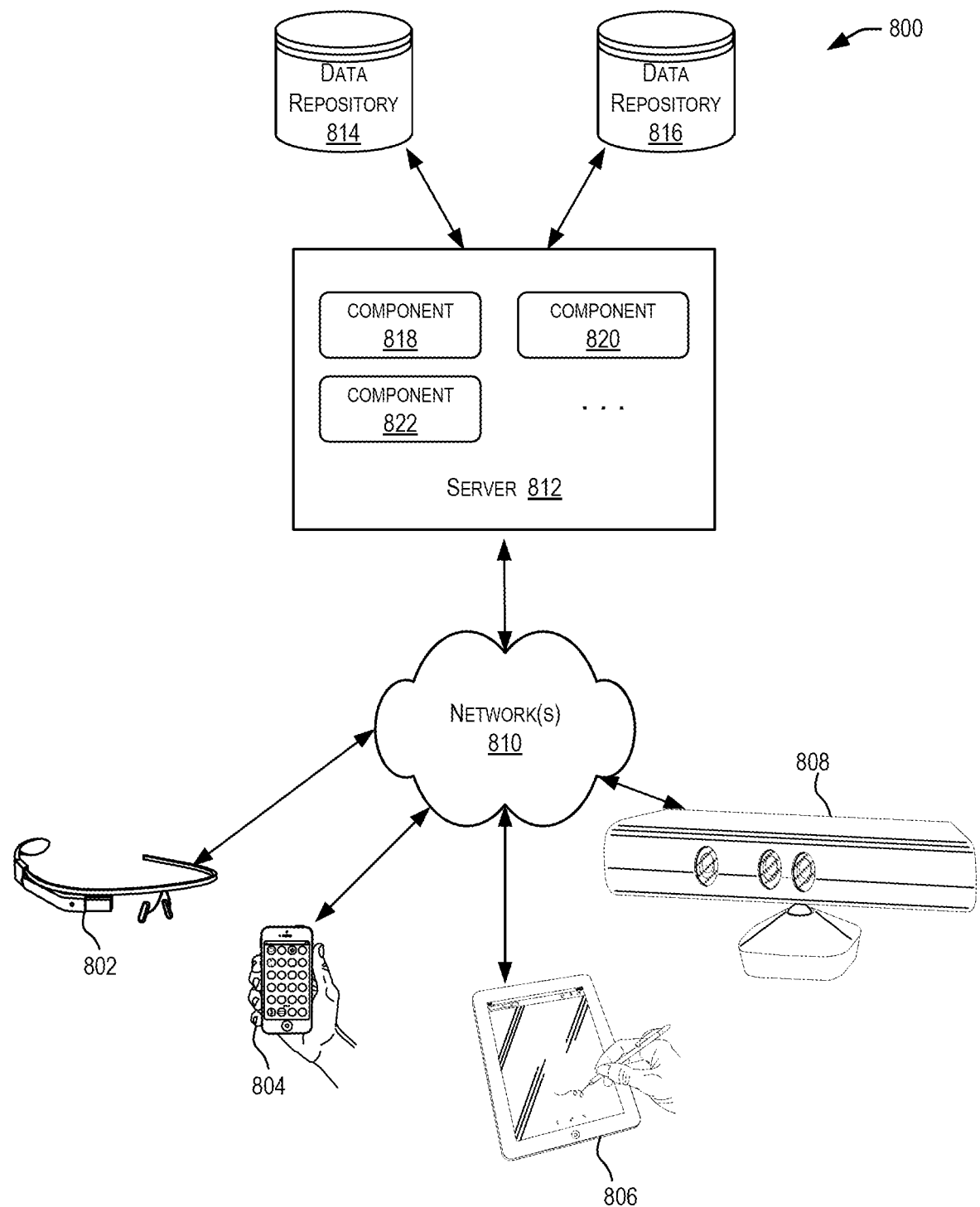
FIG. 8 depicts a simplified diagram of a distributed system for implementing various embodiments.

FIG. 8 depicts a simplified diagram of a distributed system 800. In the illustrated example, distributed system 800 includes one or more client computing devices 802, 804, 806, and 808, coupled to a server 812 via one or more communication networks 810. Clients computing devices 802, 804, 806, and 808 may be configured to execute one or more applications.

In various examples, server 812 may be adapted to run one or more services or software applications that enable one or more embodiments described in this disclosure. In certain examples, server 812 may also provide other services or software applications that may include non-virtual and virtual environments. In some examples, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The example shown in FIG. 8 is thus one example of a distributed system for implementing an example system and is not intended to be limiting.

Users may use client computing devices 802, 804, 806, and/or 808 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 8 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 may include one or more virtual machines running virtual operating systems, or other computing architectures involving virtualization such as one or more flexible pools of logical storage devices that may be virtualized to maintain virtual storage devices for the server. In various examples, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain examples. For example, one or more of the data repositories 814, 816 may be used to store information such as information related to chatbot performance or generated models for use by chatbots used by server 812 when performing various functions in accordance with various embodiments. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain examples, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 814, 816 may also be used by applications to store application data. The data repositories used by applications may be of different types such as, for example, a key-value store repository, an object store repository, or a general storage repository supported by a file system.

Figure 9:
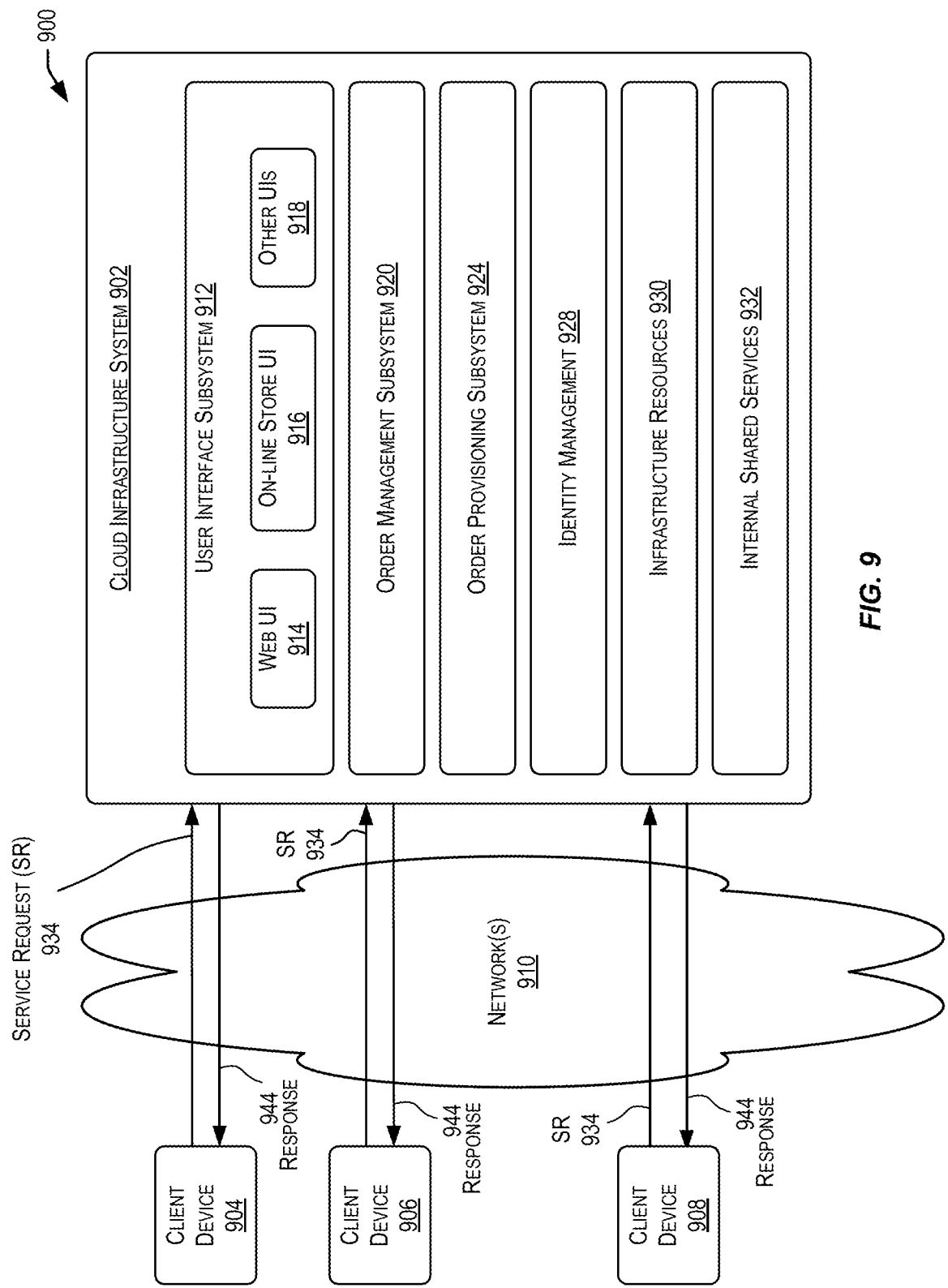
FIG. 9 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 9 is a simplified block diagram of a cloud-based system environment in which various services may be offered as cloud services in accordance with certain examples. In the example depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The example depicted in FIG. 9 is only one example of a cloud infrastructure system and is not intended to be limiting. It should be appreciated that, in some other examples, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative examples.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer may be an individual or an enterprise. In certain other examples, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 902 and the services provided may be shared by several organizations in a related community. Various other models such as hybrids of the above mentioned models may also be used.

Client computing devices 904, 906, and 908 may be of different types (such as client computing devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request information or action from a chatbot as described in this disclosure.

In some examples, the processing performed by cloud infrastructure system 902 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 902 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like. In certain examples, the storage virtual machines that are available for servicing storage requested from applications may be part of cloud infrastructure system 902. In other examples, the storage virtual machines may be part of different systems.

In certain examples, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a service offered by cloud infrastructure system 902. As part of the order, the customer may provide information identifying a chatbot system for which the service is to be provided and optionally one or more credentials for the chatbot system.

In certain examples, such as the example depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 902 as part of the provisioning process. Cloud infrastructure system 902 may generate an application ID and select a storage virtual machine for an application from among storage virtual machines provided by cloud infrastructure system 902 itself or from storage virtual machines provided by other systems other than cloud infrastructure system 902.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 902 and information identifying a chatbot system selected by cloud infrastructure system 902 for the chatbot system corresponding to the chatbot system ID.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain examples, cloud infrastructure system 902 comprises an identity management subsystem (IMS) 928 that is configured to manage customer information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
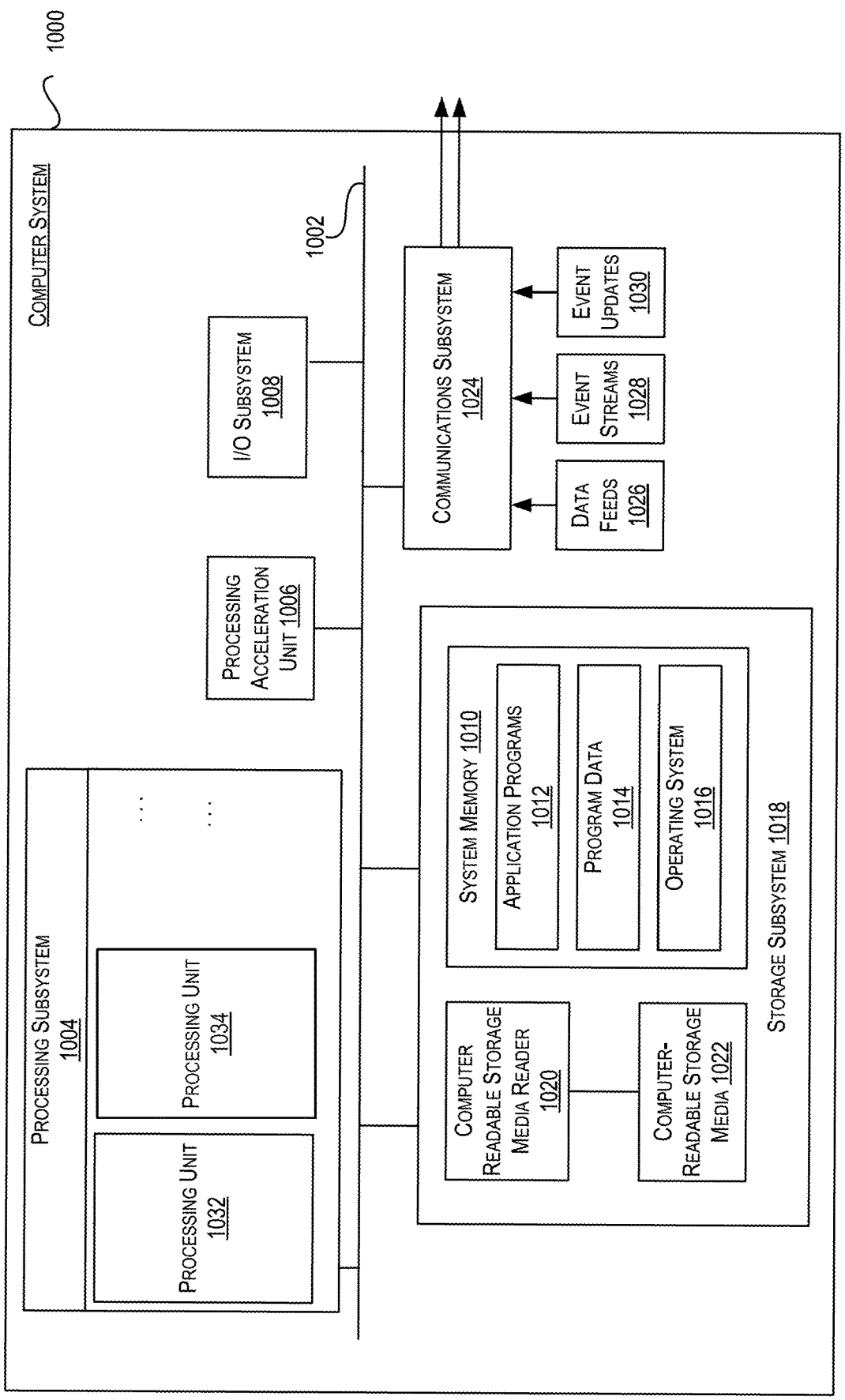
FIG. 10 illustrates an example computer system that may be used to implement various embodiments.

FIG. 10 illustrates an example of computer system 1000. In some examples, computer system 1000 may be used to implement any of the digital assistant or chatbot systems within a distributed environment, and various servers and computer systems described above. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative examples of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 may be organized into one or more processing units 1032, 1034, etc. A processing unit may include one or more processors, one or more cores from the same or different processors, a combination of cores and processors, or other combinations of cores and processors. In some examples, processing subsystem 1004 may include one or more special purpose co-processors such as graphics processors, digital signal processors (DSPs), or the like. In some examples, some or all of the processing units of processing subsystem 804 may be implemented using customized circuits, such as application specific integrated circuits (ASICs), or field programmable gate arrays (FPGAs).

In some examples, the processing units in processing subsystem 1004 may execute instructions stored in system memory 1010 or on computer readable storage media 1022. In various examples, the processing units may execute a variety of programs or code instructions and may maintain multiple concurrently executing programs or processes. At any given time, some or all of the program code to be executed may be resident in system memory 1010 and/or on computer-readable storage media 1022 including potentially on one or more storage devices. Through suitable programming, processing subsystem 1004 may provide various functionalities described above. In instances where computer system 1000 is executing one or more virtual machines, one or more processing units may be allocated to each virtual machine.

In certain examples, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some examples. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide authentication in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some examples. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1018 may also include a computer-readable storage media reader 1020 that may further be connected to computer-readable storage media 1022. Reader 1020 may receive and be configured to read data from a memory device such as a disk, a flash drive, etc.

In certain examples, computer system 1000 may support virtualization technologies, including but not limited to virtualization of processing and memory resources. For example, computer system 1000 may provide support for executing one or more virtual machines. In certain examples, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, when computer system 1000 is used to implement bot system 120 depicted in FIG. 1, the communication subsystem may be used to communicate with a chatbot system selected for an application.

Communication subsystem 1024 may support both wired and/or wireless communication protocols. In certain examples, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1024 may provide wired network connectivity (e.g., Ethernet) in addition to or instead of a wireless interface.

Communication subsystem 1024 may receive and transmit data in various forms. In some examples, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1024 may be configured to receive data in the form of continuous data streams, which may include event streams 1028 of real-time events and/or event updates 1030, which may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed:

1. A method comprising:
    obtaining one or more digital datasets for training a machine-learning model;
    selecting a plurality of metrics for evaluating performance of the machine-learning model on the one or more digital datasets, each metric of the plurality of metrics being configured based on a specification set associated with the metric, and wherein each metric is configured independently of other metrics included in the plurality of metrics, wherein the plurality of metrics is selected to include at least a size of the machine-learning model, a training time of the machine-learning model, an accuracy of the machine-learning model, a stability of the machine-learning model, a regression error of the machine-learning model, and a confidence score of the machine-learning model;
    assigning a first weight to each metric of the plurality of metrics, wherein the first weight specifies an importance of each metric in evaluating the performance of the machine-learning model;
    creating a loss function that measures the performance of the machine-learning model based on the plurality of metrics and the first weights assigned to each of the plurality of metrics;
    tuning a set of hyperparameters associated with the machine-learning model in order to obtain a minimum value of the loss function across the plurality of metrics, thereby optimizing the machine-learning model for the plurality of metrics,
    wherein the tuning comprises:
        (i) training the machine-learning model using the one or more digital datasets, wherein the machine-learning model is configured based on a current set of values for the set of hyperparameters, the current set of values being determined for a current iteration of the tuning;
        (ii) evaluating, using the loss function, performance of the machine-learning model on the one or more digital datasets, thereby obtaining a current value of the loss function for the current iteration;
        (iii) determining whether the machine-learning model is optimized for the plurality of metrics by comparing the current value of the loss function with a value of the loss function obtained in a previous iteration;
        (iv) in response to the machine-learning model not being optimized for the plurality of metrics: (a) modifying the current set of values for the set of hyperparameters to generate a modified set of hyperparameters, (b) reconfiguring the machine-learning model with the modified set of hyperparameters, and (c) repeating steps (i)-(iii) using the reconfigured machine-learning model, to determine the minimum value of the loss function; and
        (v) in response to the machine-learning model being optimized for the plurality of metrics, providing the machine-learning model configured with a set of optimal values of hyperparameters in an iteration determined to have the minimum value of the loss function, as a trained machine-learning model;
    incorporating the trained machine-learning model in a digital assistant chatbot system (DACS) configured for a set of predetermined intents; and
    based on an input utterance of a user provided to the DACS, inputting the input utterance to the trained machine-learning model, and outputting, by the trained machine-learning model, an intent for the input utterance from the set of predetermined intents.

2. The method of claim 1, further comprising:
    assigning a second weight to each digital dataset of the one or more digital datasets, wherein the second weight specifies an importance of each digital dataset in training the machine-learning model.

3. The method of claim 1, further comprising:
    establishing one or more constraints based on one or more hyperparameters of the set of hyperparameters,
    wherein the machine-learning model satisfies each of the one or more constraints.

4. The method of claim 3, wherein a first constraint of the one or more constraints corresponds to requiring a model size of the machine-learning model to be less than a threshold model size or requiring a training time of the machine-learning model to be less than a threshold time limit.

5. The method of claim 1, wherein the machine-learning model is a neural network model, and the set of hyperparameters includes at least a number of layers of the machine-learning model, a learning rate of the machine-learning model, a number of hidden units in each layer of the machine-learning model, and a learning algorithm utilized to train the machine-learning model.

6. The method of claim 1, wherein the loss function utilizes an asymmetric loss technique.

7. A computing device comprising:
a processor; and
a memory including instructions that, when executed with the processor, cause the computing device to, at least:
obtain one or more digital datasets for training a machine-learning model;
select a plurality of metrics for evaluating performance of the machine-learning model on the one or more digital datasets, each metric of the plurality of metrics being configured based on a specification set associated with the metric, and wherein each metric is configured independently of other metrics included in the plurality of metrics, wherein the plurality of metrics is selected to include at least a size of the machine-learning model, a training time of the machine-learning model, an accuracy of the machine-learning model, a stability of the machine-learning model, a regression error of the machine-learning model, and a confidence score of the machine-learning model;
assign a first weight to each metric of the plurality of metrics, wherein the first weight specifies an importance of each metric in evaluating the performance of the machine-learning model;
create a loss function that measures the performance of the machine-learning model based on the plurality of metrics and the first weights assigned to each of the plurality of metrics;
tune a set of hyperparameters associated with the machine-learning model in order to obtain a minimum value of the loss function across the plurality of metrics, thereby optimizing the machine-learning model for the plurality of metrics,
wherein tuning the set of hyperparameters includes:
 (i) training the machine-learning model using the one or more digital datasets, wherein the machine-learning model is configured based on a current set of values for the set of hyperparameters, the current set of values being determined for a current iteration of the tuning;
 (ii) evaluating, using the loss function, performance of the machine-learning model on the one or more digital datasets, thereby obtaining a current value of the loss function for the current iteration;
 (iii) determining whether the machine-learning model is optimized for the plurality of metrics by comparing the current value of the loss function with a value of the loss function obtained in a previous iteration;
 (iv) in response to the machine-learning model not being optimized for the plurality of metrics: (a) modifying the current set of values for the set of hyperparameters to generate a modified set of hyperparameters, (b) reconfiguring the machine-learning model with the modified set of hyperparameters, and (c) repeating steps (i)-(iii) using the reconfigured machine-learning model, to determine the minimum value of the loss function; and
 (v) in response to the machine-learning model being optimized for the plurality of metrics, providing the machine-learning model configured with a set of optimal values of hyperparameters in an iteration determined to have the minimum value of the loss function, as a trained machine-learning model;
incorporate the trained machine-learning model in a digital assistant chatbot system (DACS) configured for a set of predetermined intents; and
based on an input utterance of a user provided to the DACS, provide, as an input, the input utterance to the trained machine-learning model, and obtain, as an output of the trained machine-learning model, an intent for the input utterance from the set of predetermined intents.

8. The computing device of claim 7, wherein the processor is further configured to assign a second weight to each digital dataset of the one or more digital datasets, wherein the second weight specifies an importance of each digital dataset in training the machine-learning model.

9. The computing device of claim 7, wherein the processor is further configured to establish one or more constraints based on one or more hyperparameters of the set of hyperparameters, and
wherein the trained machine-learning model satisfies each of the one or more constraints.

10. The computing device of claim 9, wherein a first constraint of the one or more constraints corresponds to requiring a model size of the machine-learning model to be less than a threshold model size or requiring a training time of the machine-learning model to be less than a threshold time limit.

11. The computing device of claim 7, wherein the machine-learning model is a neural network model, and the set of hyperparameters includes at least a number of layers of the machine-learning model, a learning rate of the machine-learning model, a number of hidden units in each layer of the machine-learning model, and a learning algorithm utilized to train the machine-learning model.

12. A non-transitory computer readable medium storing specific computer-executable instructions that, when executed by a processor, cause a computer system to at least:
obtain one or more digital datasets for training a machine-learning model;
select a plurality of metrics for evaluating performance of the machine-learning model on the one or more digital datasets, each metric of the plurality of metrics being configured based on a specification set associated with the metric, and wherein each metric is configured independently of other metrics included in the plurality of metrics, wherein the plurality of metrics is selected to include at least a size of the machine-learning model, a training time of the machine-learning model, an accuracy of the machine-learning model, a stability of the machine-learning model, a regression error of the machine-learning model, and a confidence score of the machine-learning model;
assign a first weight to each metric of the plurality of metrics, wherein the first weight specifies an importance of each metric in evaluating the performance of the machine-learning model;
create a loss function that measures the performance of the machine-learning model based on the plurality of metrics and the first weights assigned to each of the plurality of metrics;
tune a set of hyperparameters associated with the machine-learning model in order to obtain a minimum value of the loss function across the plurality of metrics, thereby optimizing the machine-learning model for the plurality of metrics,
wherein tuning the set of hyperparameters includes:
 (i) training the machine-learning model using the one or more digital datasets, wherein the machine-learning model is configured based on a current set of values for the set of hyperparameters, the current set of values being determined for a current iteration of the tuning;

(ii) evaluating, using the loss function, performance of the machine-learning model on the one or more digital datasets, thereby obtaining a current value of the loss function for the current iteration;

(iii) determining whether the machine-learning model is optimized for the plurality of metrics by comparing the current value of the loss function with a value of the loss function obtained in a previous iteration;

(iv) in response to the machine-learning model not being optimized for the plurality of metrics: (a) modifying the current set of values for the set of hyperparameters to generate a modified set of hyperparameters, (b) reconfiguring the machine-learning model with the modified set of hyperparameters, and (c) repeating steps (i)-(iii) using the reconfigured machine-learning model, to determine the minimum value of the loss function; and (v) in response to the machine-learning model being optimized for the plurality of metrics, providing the machine-learning model configured with a set of optimal values of hyperparameters in an iteration determined to have the minimum value of the loss function, as a trained machine-learning model;

incorporate the trained machine-learning model in a digital assistant chatbot system (DACS) configured for a set of predetermined intents; and based on an input utterance of a user provided to the DACS, provide, as an input, the input utterance to the trained machine-learning model, and obtain, as an output of the trained machine-learning, an intent for the input utterance from the set of predetermined intents.

13. The non-transitory computer readable medium of claim 12, wherein the computer system is further configured to assign a second weight to each digital dataset of the one or more digital datasets, wherein the second weight specifies an importance of each digital dataset in training the machine-learning model.

14. The non-transitory computer readable medium of claim 12, wherein the computer system is further configured to establish one or more constraints based on one or more hyperparameters of the set of hyperparameters, and wherein the trained machine-learning model satisfies each of the one or more constraints.

15. The non-transitory computer readable medium of claim 14, wherein a first constraint of the one or more constraints corresponds to requiring a model size of the machine-learning model to be less than a threshold model size or requiring a training time of the machine-learning model to be less than a threshold time limit.

16. The non-transitory computer readable medium of claim 12, wherein the machine-learning model is a neural network model, and the set of hyperparameters includes at least a number of layers of the machine-learning model, a learning rate of the machine-learning model, a number of hidden units in each layer of the machine-learning model, and a learning algorithm utilized to train the machine-learning model.

* * * * *